United States Patent [19]

MacFarlane

[11] Patent Number: 5,009,199
[45] Date of Patent: Apr. 23, 1991

[54] INTAKE RESERVOIR FOR AN ENGINE HAVING A CHECK VALVE

[75] Inventor: Glen R. MacFarlane, Clarkston, Mich.

[73] Assignee: General Motors Corporation, Detroit, Mich.

[21] Appl. No.: 535,000

[22] Filed: Jun. 8, 1990

[51] Int. Cl.⁵ .............................................. F02M 35/10
[52] U.S. Cl. ................................. 123/52 MF; 123/316
[58] Field of Search .......... 123/52 M, 52 MB, 52 MC, 123/52 MV, 52 MF, 52 ML, 316

[56] References Cited

U.S. PATENT DOCUMENTS

| | | | |
|---|---|---|---|
| 3,810,454 | 5/1974 | Hunt | 123/52 MF |
| 3,937,194 | 2/1976 | Tamaki et al. | 123/568 |
| 4,232,641 | 11/1980 | Curtil | 123/316 |
| 4,356,798 | 11/1982 | Sakaoka et al. | 123/52 MF |
| 4,401,063 | 8/1983 | Haase | 123/73 B |
| 4,422,416 | 12/1983 | Bernardoni | 123/52 MF |
| 4,488,519 | 12/1984 | Kishida | 123/52 M |
| 4,517,947 | 5/1985 | Nishikawa et al. | 123/52 MF |
| 4,538,555 | 9/1985 | Kite | 123/52 MB |
| 4,773,358 | 9/1988 | heath | 123/52 MF |
| 4,796,584 | 1/1989 | Goto et al. | 123/52 MF |
| 4,890,582 | 1/1990 | Schatz et al. | 123/52 MF |
| 4,928,639 | 5/1990 | Schatz | 123/52 MF |

FOREIGN PATENT DOCUMENTS 0889878 12/1981 U.S.S.R. ........................ 123/52 MF

OTHER PUBLICATIONS

"Alfa Romeo", Automotive Engineering, vol. 96, No. 11, Nov. 1988, pp. 109–110.
"Improving the Torque Characteristic of a Small Four Stroke Four Cylinder Engine by Using Reed Valves in the Intake manifold", SAE Technical Paper Series 890222, 1989.

Primary Examiner—David A. Okonsky
Attorney, Agent, or Firm—Gordon F. Belcher

[57] ABSTRACT

An intake reservoir for an engine having an intake passage leading to a cylinder, and a check valve in the intake passage to allow fluid flow toward the cylinder and obstruct fluid back-flow in the reverse direction. An intake valve is seated in the intake passage between the check valve and cylinder. A bypass port is located on the intake passage so that the bypass port communicates with a trapped volume defined by the portion of the intake passage between the check valve and intake valve. The intake reservoir comprises a reservoir cavity having a single cavity port, and a port passage connected between the cavity port and the bypass port enabling fluid flow between the trapped volume and the reservoir cavity. The intake reservoir further comprises a control valve connected to the port passage enabling active adjustment of the flow area of the port passage throughout a range of engine operating conditions to regulate fluid flow between the trapped volume and reservoir cavity.

3 Claims, 1 Drawing Sheet

INTAKE RESERVOIR FOR AN ENGINE HAVING A CHECK VALVE

TECHNICAL FIELD

This invention relates to an engine having a check valve in an intake passage leading to a cylinder in the engine and an intake reservoir connected to the intake passage downstream of the check valve to allow gas to flow between the intake reservoir and the intake passage downstream of the check valve.

BACKGROUND

A check valve can be located in the intake passage leading to a cylinder of an engine to obstruct fluid backflow out of the cylinder into the intake passage. One application of such a check valve is in conjunction with a valve control system which causes the intake valve for the cylinder to open during the exhausting of exhaust gas from the cylinder (i.e., during an exhaust portion of the engine cycle). This can result in exhaust gas flowing from the cylinder back into the intake passage and reentering the cylinder with the subsequent incoming charge of air. The check valve obstructs fluid back-flow further into the intake passage.

A port can be located on the intake passage between the intake valve and check valve, and a chamber having a fixed opening connected to the bypass port to allow communication between the chamber and intake passage. The effective volume of the intake passage between the check valve and intake valve is thereby increased by an amount approximately equal to the volume of the chamber. The fixed opening of the chamber can limit the control of the fluid flow between the intake passage and chamber thereby limiting the potential improvements in engine performance produced by the chamber since the optimum amount of flow between the intake passage and chamber can vary depending on the operating conditions of the engine.

SUMMARY OF THE INVENTION

The present invention provides an intake reservoir for an engine having an intake passage leading to a cylinder, and a check valve in the intake passage to allow fluid flow toward the cylinder and obstruct fluid back-flow in the reverse direction An intake valve is seated in the intake passage between the check valve and cylinder. A bypass port is located on the intake passage so that the bypass port communicates with a trapped volume defined by the portion of the intake passage between the check valve and intake valve. The intake reservoir comprises a reservoir cavity having a single cavity port, and a port passage connected between the cavity port and the bypass port enabling fluid flow between the trapped volume and the reservoir cavity. The intake reservoir further comprises a control valve connected to the port passage enabling active adjustment of the flow area of said port passage throughout a range of engine operating conditions to regulate fluid flow between the trapped volume and the reservoir cavity.

When used in conjunction with an intake valve which allows exhaust gas to flow from the cylinder back into the trapped volume, the intake reservoir enables improvements in engine performance over a wider range of engine operating conditions since the control valve can be adjusted so that the optimum fluid flow between the reservoir cavity and trapped volume is maintained for different engine operating conditions.

These and other features and advantages of the invention will be more fully understood from the following description of certain specific embodiments of the invention taken together with the accompanying drawing.

BRIEF DRAWING DESCRIPTION

In the drawing:

FIG. 1 is a schematic view showing an embodiment of the intake reservoir of the present invention connected to an engine.

DETAILED DESCRIPTION

Figure 1:
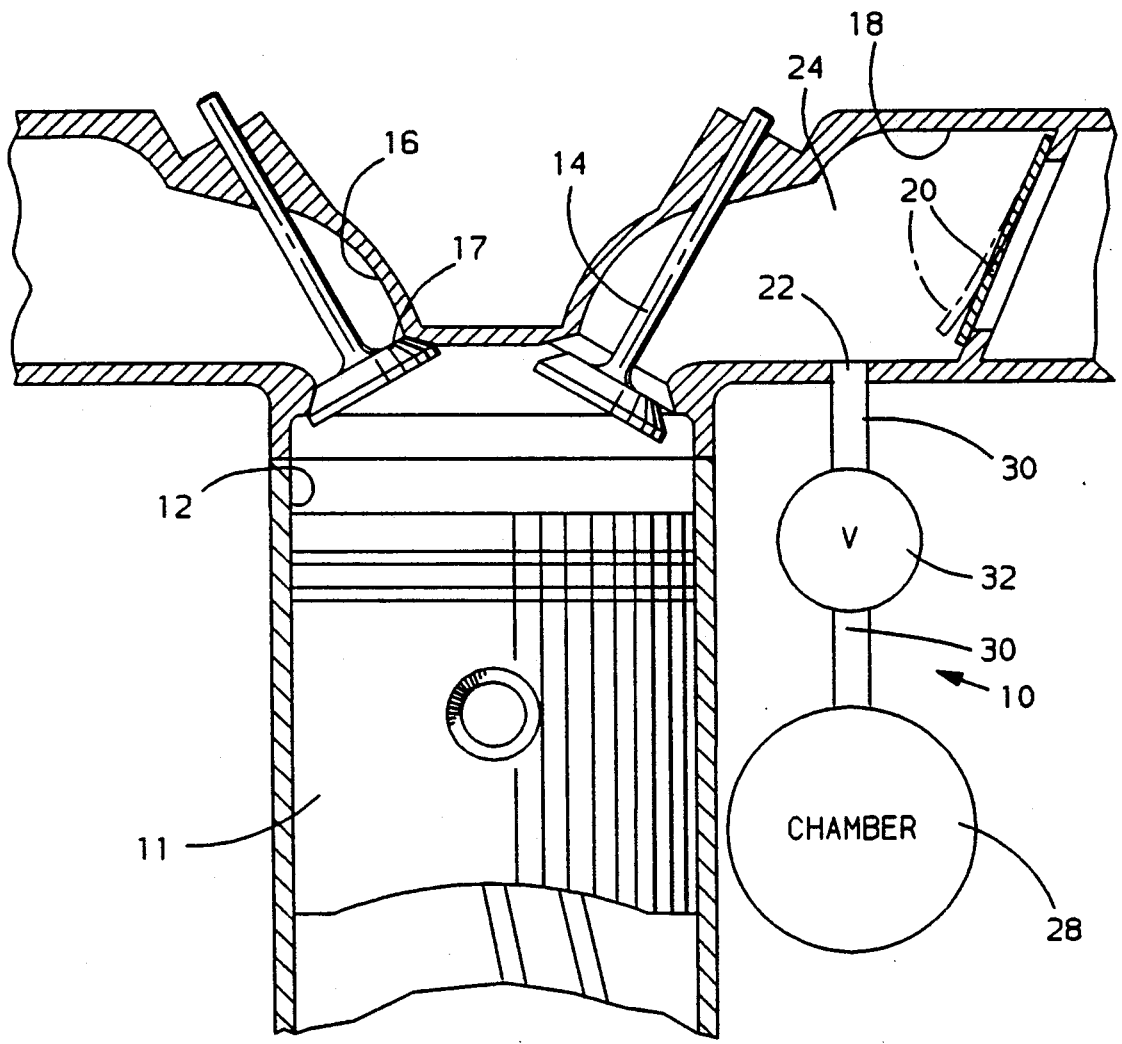

Referring now to FIG. 1 in detail, numeral 10 generally refers to an intake reservoir of the present invention connected to an engine. The engine includes a piston 11 disposed in a cylinder 12, an intake passage 18 leading to the cylinder, and an exhaust passage 16 leading away from the cylinder. A check valve 20, such as a reed valve, is located in the intake passage 18. The check valve 20 allows fluid flow toward the cylinder 12 and obstructs fluid back-flow in the reverse direction.

An intake valve 14 is seated in the intake passage 18 between the check valve 20 and cylinder 12. An exhaust valve 17 is seated in the exhaust passage 16.

A bypass port 22 is located on the intake passage 18 so that the bypass port communicates with a trapped volume 24 defined by the portion of the intake passage between the check valve 20 and intake valve 14.

Although FIG. 1 shows a single cylinder 12, the intake reservoir 10 may also be used with a multi-cylinder engine. The intake reservoir 10 may also be used with a two-stroke engine.

The intake reservoir 10 comprises a reservoir cavity 28 having a single cavity port and a port passage 30 connected between the cavity port and the bypass port 22 enabling fluid flow between the trapped volume 24 and reservoir cavity. A control valve 32 is connected to the port passage 30 enabling active adjustment of the flow area of the port passage throughout a range of engine operating conditions to regulate fluid flow between the trapped volume 24 and the reservoir cavity. The control valve 32 preferably comprises a stepper motor activated controlled orifice. The control valve 32 may also comprise an on/off solenoid controlled valve or other types of solenoid controlled valves.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An intake reservoir for an engine having an intake passage leading to a cylinder, a check valve in the intake passage to allow fluid flow toward the cylinder and obstruct fluid back-flow in the reverse direction, an intake valve seated in the intake passage between the check valve and cylinder, and a bypass port located on the intake passage so that the bypass port communicates with a trapped volume defined by the portion of the intake passage between the check valve and intake valve, the intake reservoir comprising a reservoir cavity having a single cavity port, a port passage connected between said cavity port and the bypass port enabling fluid flow between the trapped volume and said reservoir cavity, and a control valve connected to said port passage enabling active adjustment of the flow area of said port passage throughout a range of engine operating conditions to regulate fluid flow between the trapped volume and said reservoir cavity.

2. An intake reservoir as set forth in claim 1 in combination with an intake valve seated int he intake passage between the check valve and cylinder, said intake valve being open during at least a portion of the period when exhaust gas is exhausted from the cylinder so that exhaust gas flows from the cylinder back into the trapped volume.

3. An intake reservoir for an engine having an intake passage leading to a cylinder, a check valve in the intake passage to allow fluid flow toward the cylinder and obstruct fluid back-flow in the reverse direction, an intake valve seated in the intake passage between the check valve and cylinder, the intake valve being open during at least a portion of the period when exhaust gas is exhausted from the cylinder so that exhaust gas flows from the cylinder back into the intake passage, and a bypass port located on the jintake passage so that the bypass port communicates with a trapped volume defined by the portion of the intake passage between the check valve and intake valve, the intake reservoir comprising a reservoir cavity having a single cavity port, a port passage connected between said cavity port and the bypass port enabling fluid flow between the trapped volume and said reservoir cavity, and a control valve connected to said port passage enabling active adjustment of the flow area of said port passage throughout a range of engine operating conditions to regulate fluid flow between the trapped volume and said reservoir cavity.

* * * * *